United States Patent [19]

McCready et al.

[11] Patent Number: 4,732,948

[45] Date of Patent: Mar. 22, 1988

[54] SOLID PHASE POLYCONDENSATION PROCESS FOR THE PRODUCTION OF HIGH MOLECULAR WEIGHT POLYETHERIMIDE ESTER POLYMERS

[75] Inventors: Russell J. McCready; John A. Tyrell, both of Mt. Vernon, Ind.

[73] Assignee: General Electric Company, Pittsfield, Mass.

[21] Appl. No.: 936,698

[22] Filed: Dec. 2, 1986

[51] Int. Cl.$^4$ .............................................. C08G 8/00
[52] U.S. Cl. .................................................... 525/437
[58] Field of Search ................ 525/437; 528/288, 289, 528/296, 279

[56] References Cited

U.S. PATENT DOCUMENTS

| | | | |
|---|---|---|---|
| 4,371,692 | 2/1983 | Wolfe | 528/289 |
| 4,371,693 | 2/1983 | Wolfe | 528/292 |
| 4,544,734 | 10/1985 | McCready | 528/288 |
| 4,552,950 | 11/1985 | McCready | 528/292 |
| 4,556,688 | 12/1985 | McCready et al. | 525/33 |
| 4,556,705 | 12/1985 | McCready | 528/289 |

Primary Examiner—Lucille M. Phynes

[57] ABSTRACT

A method for preparing high molecular weight polyetherimide ester polymers comprising:

(A) preparing a polyetherimide ester oligomer by co-reacting
  (i) at least one diol,
  (ii) at least one dicarboxylic acid or an ester forming reactive derivative thereof, and
  (iii) a set of reactants selected from
    (a) (1) at least one high molecular weight poly(oxy alkylene)diamine, and (2) at least one tricarboxylic acid or a derivative thereof, or
    (b) at least one high molecular weight polyoxyalkylene diimide diacid,
at elevated temperature and for a period of time effective to form said oligomer; and then
(B) further polymerizing said oligomer by a solid phase polycondensation procedure comprising heating said oligomer at a temperature effective to further polymerize said oligomer to a high molecular weight polyetherimide ester polymer but below the melting point of said oligomer.

The instant process is useful for forming high molecular weight polyetherimide ester polymers suitable for production of extruded and molded articles.

25 Claims, No Drawings

SOLID PHASE POLYCONDENSATION PROCESS FOR THE PRODUCTION OF HIGH MOLECULAR WEIGHT POLYETHERIMIDE ESTER POLYMERS

BACKGROUND OF THE INVENTION

Polyetherimide ester elastomers comprised of the reaction products of (a) a low molecular weight diol, (b) a dicarboxylic acid, (c) a high molecular weight poly(oxy alkylene)diamine, and (d) a tricarboxylic acid or its derivative. along with processes for their preparation, are described in U.S. Pat. Nos. 4,544,734 and 4,556,705 to McCready and in U.S. Pat. No. 4,556,688 to McCready et al. These poly (etherimide ester) elastomers exhibit excellent stress-strain properties, low tensile set, high melting temperatures and/or excellent strength/toughness characteristics as well as superior flexibility, which properties render them especially suitable for molding and extrusion applications. These polymers are usually produced by melt condensation or solution condensation processes. While these processes are generally quite effective in producing polyetherimide ester polymers, they nevertheless suffer from several problems or disadvantages when utilized in the preparation of very high molecular weight polyetherimide ester polymers. These disadvantages include thermal degradation of the very high molecular weight polymer, economic penalties associated with the production of high molecular weight polymers, and some discoloration of the resultant high molecular weight polymer.

It has now been discovered that polyetherimide ester polymers, particularly very high molecular weight polyetherimide ester polymers, can be effectively and efficiently produced by the utilization of a solid phase polycondensation process.

SUMMARY OF THE INVENTION

The instant invention is directed to a process for the preparation of polyetherimide ester polymers, particularly very high molecular weight polyetherimide ester polymers. More particularly the instant process is a two stage process comprising a first stage in which an oligomer of the polyetherimide ester is formed using a melt condensation or solution condensation process, and a second stage in which the oligomer formed in the first stage is further polymerzied to form a high molecular weight polyetherimide ester polymer using a solid phase polycondensation procedure.

DESCRIPTION OF THE INVENTION

In accordance with the instant invention there is provided a novel process for the preparation of high molecular weight polyetherimide ester polymers which are comprised of the reaction products of:
 (i) at least one diol:
 (ii) at least one dicarboxylic acid or an ester forming reactive derivative thereof; and
 (iii) a set of reactants selected from
  (a) (1) at least one high molecular weight poly (oxy alkylene)diamine, and (2) at least one tricarboxylic acid or its derivative, or
  (b) at least one high molecular weight polyoxyalkylene diimide diacid.

The instant process is comprised of two stages. In the first stage reactants (i)–(iii) are reacted in either a melt oligomerization process or a solution oligomerization process to produce a low molecular weight oligomer or prepolymer comprised of the reaction products of (i)–(iii). After this oligomer is formed it is then subjected to a second stage which comprises a solid phase condensation or polymerization process in which the oligomer produced in the first stage is further polymerized to form a high molecular weight polyetherimide ester polymer.

Suitable diols (i) for use in preparing the polymers of the present invention include the saturated and unsaturated aliphatic and cycloaliphatic dihydroxy compounds as well as aromatic dihydroxy compounds. These diols are preferably of a low molecular weight, i.e., having a molecular weight of about 250 or less. When used herein, the term "diol" and "low molecular weight diol" should be construed to include equivalent ester forming derivatives thereof, provided however that the molecular weight requirement pertains to the diol only and not to its derivative. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and esterforming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent groups(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethysuberic acid, tetramethylsuccinic acid, cyclopentanedicarboxylic acid, decahydro-1,5 naphthlene dicarboxylic acid; 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphtalene dicarboxylic acid, 2,7-naphtalene diacarboxylic acid, phenantherene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

In the first stage of the instant two stage process the polyetherimide ester oligomers may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a) (2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use herein may be represented by the formula

$$H_2N-G-NH_2 \qquad \text{I.}$$

wherein G is the radical remaining after the removal of the amino groups of a long chain alkylene ether diamine. These polyether primary diamines are available commercially from Texaco Chemical Company under the tradename JEFFAMINE. In general they are prepared by known processes for the amination of glycols. For example, they may be prepared by aminating glycol in the presence of ammonia, Raney nickel catalyst and hydrogen as set forth in Belgium Patent No. 634,741. Alternately, they may be prepared by treating glycol with ammonia and hydrogen over a Nickel-Copper-Chromium catalyst as taught by U.S. Pat. No. 3,654,370. Other methods for the production thereof include those taught in U.S. Pat. Nos. 3,155,728 and 3,236,895 and French Patent Nos. 1,551,605 and 1,466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3:1.

Representative long chain ether diamines are the poly(alkylene ether)diamines including poly(ethylene ether)diamine, poly(propylene ether)diamine, poly(tetramethylene ether)diamine: random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly (tetramethylene ether)diamine, and the poly(ethylene ether)glycols which are end-capped with poly (propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3', 4-diphenyl tricarboxylic anhydride, 3,3', 4-benzophenone tricarboxylic anhydride, 1,3,4-cyclopentane tricarboxylic anhydride, 2,2',3-diphenyl tricarboxylic anhydride, diphenyl sulfone3,3', 4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

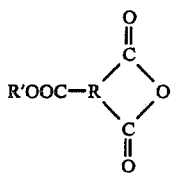

II.

wherein:
R is a trivalent organic radical, preferably a $C_2$–$C_{20}$ aliphatic or cycloaliphatic, or $C_6$–$C_{20}$ aromatic trivalent organic radical;

$R^1$ is preferably hydrogen or a monovalent organic radical preferably selected from $C_1$–$C_6$ aliphatic or cycloaliphatic radicals and $C_6$–$C_{12}$ aromatic radicals, e.g., benzyl, most preferably hydrogen.

In the preparation of the instant polyetherimide ester oligomers in the first stage of the instant process sufficient amounts of diol versus dicarboxylic acid, and tricarboxylic acid versus diamine must be present, as recognized in the art, to allow for substantially complete oligomerization.

This type of one-pot reaction involveing the reactions of the diol component (i), a dicarboxylic acid component (ii), a high molecular weight poly (oxy alkylene)-diamine (iii)(a)(1), and a tricarboxylic acid component (iii)(a)(2) is described, in general, in U.S. Pat. No. 4,556,688, incorporated herein by reference, with the exception that it is used to produce polymers rather than oligomers. In this one-pot reaction the amount of diol employed is at least an equimolar amount, preferably a molar excess, preferably about 1.5 molar equivalents, based on the combined molar equivalents of the dicarboxylic acid and the tricarboxylic acid. The amount of tricarboxylic acid employed will preferably be about two molar equivalents based on the number of moles of the diamine (iii)(a)(1). Obviously, less than two molar equivalents would result in incomplete imidization of the diamine resulting in potentially poorer properties. Conversely, greater than two molar equivalents of the tricarboxylic acid component may lead to cross-linking and/or branching of the finished polymer. Generally, mole ratios of about 2 moles of tricarboxylic acid to about 0.85 to about 1.15 moles of the poly(oxy alkylene)diamine eventually yield useful polymers.

The amounts by which the high molecular weight poly(oxy alkylene)diamine (iii)(a)(1) and the dicarboxylic acid (ii) are used in the first stage of the instant process, i.e., in forming the polyetherimide ester oligomers or prepolymers, are such that the weight ratio of the theoretical amount of the polyoxyalkylene diimide diacid, formable from the poly(oxy alkylene)diamine and the tricarboxylic acid, to the dicarboxylic acid is from about 0.05 to about 2.0:1, preferably from about 0.4 to about 1.4:1. In general, the lower the ratio of the polyoxyalkylene diimide diacid to dicarboxylic acid the better the strength, crystallization and heat distortion of the final polymer. Alternately, the higher the ratio of the polyoxyalkylene diimide diacid to the dicarboxylic acid the better the flexibility, tensile set and low temperature impact characteristics of the finished polymer.

The polyetherimide ester oligomers or prepolymers may also be prepared in the first stage of the instant two-stage process by the utilization of a so-called two-pot synthesis involving the reaction of the diol (1), The dicarboxylic acid (ii), and the polyoxyalkylene diimide diacid (iii) (b). Such a reaction is described in general terms in U.S. Pat. No. 4,556,705, incorporated herein by reference, with the execption that it is used to form the polymers rather than the oligomers of the instant invention. Basically, in this process the poly(oxy alkylene)-diamine is reacted with the tricarboxylic acid to form a high molecular weight polyoxyalkylene diimide diacid, and the preformed polyoxyalkylene diimide diacid is then reacted with the diol and the dicarboxylic acid to form the polyetherimide ester oligomers or prepolymers.

The polyoxyalkylene diimide diacid (iii)(b) may be represented by the general formula

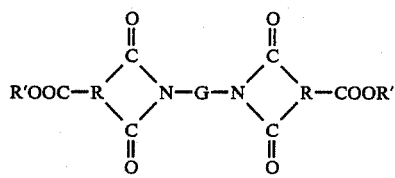

III.

wherein G, R and R' are as defined hereinafore.

The polyoxyalkykene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl groups which must be esterifiable with the high molecular weight poly(oxy alkylene)diamine (iii)(a)(1). These polyoxyalkylene diimide diacids and processes for their preparation are disclosed in U.S. Pat. No. 4,556,705 which is incorporated herein by reference. Briefly, these high molecular weight polyoxyalkylene diimide diacids may be prepared by known imidization processes including melt synthesis or by synthesizing in a solvent system. Such reactions will generally occur at temperatures from about 100° C. to about 300° C., preferably at temperatures from about 150° C. to about 250° C., while drawing off water or in a solvent system at the reflux temperature of the the solvent or azeotropic (solvent) mixture.

In this two-pot process for forming the polyetherimide ester oligomers, as in the one-pot process for forming the oligomers described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol will generally allow for optimal yields of the oligomer in the first stage process, based on the amount of acids, while accounting for the loss of diol during esterification.

In this two-pot process for forming the oligomer the amounts of the polyoxyalkylene diimide diacid and dicarboxylic acid present in the reaction mixture should be such that the weight ratio of the polyoxyalkylene diimide diacid to the dicarboxylic acid is from about 0.05 to about 2.0:1, preferably from about 0.4 to about 1.4:1.

The polyetherimide ester oligomers produced in the first stage of the instant two stage process, utilizing either the one-pot process or the two-pot process, may be prepared by conventional esterification/condensation reactions for the production of polyesters. Exemplary of the techniques that may be practiced are those set forth, for example, in U.S. Pat. Nos. 3,023,192: 3,763,109; 3,651,014; 3,663,653 and 3,810,547, all of which are incorporated herein by reference. Typically, the reactants will be charged into the reactor vessel and heated to about 150° C. to about 260° C. Heating is continued until the methanol and/or water evolution is substantially complete. Depending upon the temperature, catalyst, and diol excess, this oligomerization is complete within a few minutes to a few hours. This first stage oligomer forming reaction may be terminated when the oligomers reach a desired degree of oligomerization, e.g., a desired degree of viscosity. Generally this first stage reaction is terminated when the polyetherimide ester oligomers reach a viscosity of at least about 250 centipoise, preferably at least about 500 centipoise, and more preferably at least about 1,000 centipoise.

In the first stage process of the present invention, particularly where all the reactants are charged to the reactor together, i.e., the one-pot process, or where the polyoxyalkylene diimide diacid is preformed, i.e., the two-pot process, and an excess of tricarboxylic acid is present, a minor amount of the tricarboxylic acid or anhydride may react with the available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacids, are substantially free of branching. If branching is desired, one needs only to introduce a branching agent, such as trimellitic anhydride, along with the preformed diimide diacid. The amount of branching agent generally will be less than about 0.15 moles per mole of diimide diacid. Useful branching agents other than trimellitic anhydride include trimethyl trimellitate, glycerol, trimethylol propane, trimesic acid and its esters, and the like.

In their preferred embodiments, the oligomers obtained by the first stage reaction of the instant invention will comprise the reaction products of dimethyl terephthalate, optionally with up to 40 mole percent of another dicarboxylic acid component; butane diol, optionally with another diol such as butene diol, hexane diol, or cyclohexane dimethanol; and either a poly(oxy alkylene)diamine having an average molecular weight of from 600 to about 12,000, preferably from about 900 to about 4,000, and trimellitic anhydride, or a polyoxyalkylene diimide diacid having an average molecular weight of at least about 700, preferably at least about 900, and derived from trimellitic anhydride. In their more preferred embodiments the diol will be butane diol and the dicarboxylic acid will be 100 mole % dimethyl terephthalate.

Additionally, while not required, it is customary and generally preferred to utilize a catalyst or catalyst system in the first stage process for the production of the polyetherimide ester oligomers of the present invention. In general, any of the known ester-interchange and polycondensation catalysts may be used. Although two separate catalysts or catalyst systems may be used, one for ester interchange and one for polycondensation, it is preferred, where appropriate, to use one catalyst system for both. In those instances where two separate catalysts are used, it is preferred and advantageous to render the ester-interchange catalyst ineffective following the completion of the precondensation reaction by means of known catalyst quenchers or inhibitors, in particular the phosphorus compounds such as, for example, phosphoric acid, phosphenic acid, the alkyl or aryl esters or salts thereof, and the like, in order to increase the thermal stability of the final resultant high molecular weight polyetherimide ester polymer.

Exemplary of suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts as well as additional useful catalysts are described in U.S Pat. Nos 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described, for example, in U.S. Pat. Nos. 2,720,502; 2,727,881; 2,729,619; 2,822,348; 2,906,737; 3,047,515; 3,056,817; 3,056,818 and 3,075,952, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as, for example, zinc acetate, calcium acetate, manganese acetate or antimony trioxide, and/or with a catalyst quencher as described above. The catalyst is used in catalytic amounts, e.g., from about 0.005 to about 2 percent by weight based on total reactants.

When the oligomer has reached or attained the desired viscosity the first stage of the instant two stage process is terminated, the oligomer is isolated, and the isolated oligomer is then subjected to the second stage wherein it is further polymerized or condensed to form a high molecular weight polyetherimide ester polymer.

At this point, i.e., the end or termination of the first oligomerization or prepolymerization stage, the oligomer is comprised of the relatively low molecular weight reaction products of:
(i) at least one diol;
(ii) at least one dicarboxylic acid or an ester forming reactive derivative thereof; and
(iii) a set of reactants selected from
(a) (1) at least one high molecular weight poly(oxy alkylene)diamine, and (2) at least one tricarboxylic acid or its derivative, or
(b) at least one high molecular weight polyoxyalkylene diimide diacid.

This oligomer generally has a viscosity of at least about 250 centipoise, preferably at least about 500 centipoise, and more preferably at least about 1,000 centipoise. A viscosity greater than about 200,000 should generally not be exceeded, preferably about 150,000, and more preferably about 100,000.

This oligomer is then subjected to the second or final stage of the instant two stage process which is comprised of a solid phase polymerization or polycondensation process. In this second stage the oligomer or prepolymer having a relatively low molecular weight is further polymerized to form a high molecular weight polyetherimide ester polymer.

In this second stage the oligomer which has been isolated from the first stage oligomerization reaction, and which has been ground or comminuted into small particles, i.e., having a particle size less than about ⅛"×⅛"×⅛", is heated at a temperature below the softening or melting point of the oligomer until a high molecular weight polymer of the desired molecular weight or viscosity is obtained.

In general, the smaller the particles or pellets that the oligomer is formed into after the completion of the first stage, the more efficient the second stage reaction.

This second stage is generally carried out at temperatures from about 1000° C. to about 250° C., for periods of time ranging from a few minutes to several hours. The temperatures and times are generally dependent upon the particular polyetherimide ester oligomer being reacted and the degree of polymerization, i.e., molecular weight, that it is desired to achieve. Generally, the temperatures are such that they are below the melting or softening point of the oligomer or prepolymer but high enough to obtain further polymerization or increase in molecular weight of the oligomer.

This second stage polycondensation or further polymerization may be carried out without the addition of any additional catalyst, or it may be carried out in the presence of additional catalyst which has been added to the reaction vessel. The additional catalyst, if present, is generally a polycondensation catalyst of the type described hereinafore. While not wishing to be bound by any theory or speculation it is believed that the oligomer which is isolated from the first stage contains some of the catalyst used in the first stage as a contaminant or impurity.

Upon the polymer reaching a high molecular weight, e.g., the desired viscosity, the second stage reaction is terminated and the high molecular weight polymer is isolated.

The high molecular weight polyetherimide ester polymers produced by the process of the instant invention contain at least the following two recurring structural units:

and

wherein:
A is the residue of the high molecular weight polyoxyalkylene diimide diacid absent the two carboxyl groups, i.e.,

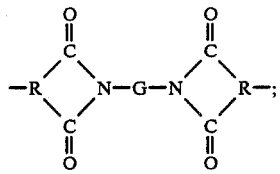

$R^1$ is the residue of the diol absent the two hydroxy groups: and
$R^2$ is the residue of the dicarboxylic acid absent the two carboxyl groups.

DESCRIPTION OF THE PREFERRED EMBODIMENT

In order to further illustrate the present invention the following example is presented. The following example is presented by way of illustration and not by way of limitation. In the example all parts and percentages are on a weight basis unless otherwise specified.

The following example illustrates the process of the present invention.

EXAMPLE 1

Into a reactor vessel are placed 158 parts by weight of butanediol, 140 parts by weight of a high molecular weight polyoxyalkylene diimide diacid (prepared by the imidization of trimellitic anhydride with JEFFAMINE D2000, a propylene ether diamine having an average molecular weight of 2,000, marketed by Texaco Chemical Co.), 200 parts by weight of dimethyl terephthalate, a phenolic antioxidant, and a titanium catalyst. The mixture is heated to about 190° C. whereupon methanol is generated. After the theoretical amount of methanol is removed the pot temperature is increased to about 250° C. and a vacuum applied to produce the polyetherimide ester oligomer. The oligomer is poured into water to solidify, removed from the water, and the material ground to below 2 millimeters diameter particle size.

The viscosity of this oligomer is determined to be 4,000 centipoise at 250° C.

The oligomer particles produced in the first stage described above are placed in a reactor and heated at 175° C. with stirring of the powder and with a stream of hot nitrogen passing over said particles. The oligomer is treated in this fashion for thirteen hours, cooled and the viscosity measured to be 270,000 centipoise.

In the second polymerization or polycondensation stage of the instant two stage process the heating of the oligomer at temperatures below its softening point or melting point may be conducted either at ambient pressures or under vacuum conditions, e.g., less than 1 mm Hg. When carried out at ambient temperatures it is preferred that the reaction be carried out in an inert atmosphere, e.g., nitrogen.

A major advantage of the instant process is the ability to produce high molecular weight polymers without subjecting the resin to extended periods of high temperature, which causes degradation of the resin.

Obviously other modifications and variations are possible in light of the above teachings. It is, therefore, to be understood that changes may be made in the particular embodiments of the invention as set forth hereinafore which are within the full intended scope of this invention as defined by the appended claims.

What is claimed is:

1. A method for preparing high molecular weight polyetherimide ester polymers comprising:
   (A) preparing a polyetherimide ester oligomer by coreacting
      (i) at least one diol,
      (ii) at least one dicarboxylic acid or an ester forming reactive derivative thereof, and
      (iii) a set of reactants selected from
         (a) (1) at least one high molecular weight poly(oxy alkylene)diamine, and (2) at least one tricarboxylic acid or its derivative, or
         (b) at least one high molecular weight polyoxyalkylene diimide diacid,
      at elevated temperature and for a period of time effective to form said oligomer and then
   (B) heating said oligomer at a temperature effective to further polymerize said oligomer to a high molecular weight polyetherimide ester but below the melting point of said oligomer.

2. The method of claim 1 wherein (A) is carried out at a temperature sufficient to form a molten reaction mixture.

3. The method of claim 2 wherein (A) is carried out in the presence of a catalytic amount of a catalyst.

4. The method of claim 3 wherein said catalyst is a titanium catalyst.

5. The method of claim 1 wherein said oligomer in (B) is in the form of small particles.

6. The method of claim 5 wherein said particles have an average diameter of 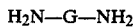 or less.

7. The method of claim 1 wherein said diol (i) is a low molecular weight diol.

8. The method of claim 7 wherein said low molecular weight diol is selected from butanediol, hexanediol, butenediol, cyclohexane dimethanol, or mixtures thereof.

9. The method of claim 7 wherein said dicarboxylic acid (ii) is an aromatic dicarboxylic acid or its ester forming reactive derivative.

10. The method of claim 9 wherein said dicarboxylic acid or its ester forming reactive derivative is dimethyl terephthalate.

11. The method of claim 1 wherein (iii) is (a).

12. The method of claim 11 wherein said poly(oxy alkylene)diamine has an average molecular weight of from about 600 to about 12,000 and is represented by the formula $$H_2N-G-NH_2$$

wherein G is the residue remaining after the removal of the amino groups of a long chain poly(alkylene ether) diamine.

13. The method of claim 12 wherein said poly(oxy alkylene)diamine has an average molecular weight of from about 900 to about 4,000.

14. The method of claim 12 wherein said tricarboxylic acid or its derivative is represented by the formula

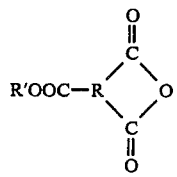

wherein
R is a trivalent organic radical selected from $C_2-C_{20}$ aliphatic or cycloaliphatic organic trivalent radicals, or $C_6-C_{20}$ aromatic trivalent organic radicals, and R' is selected from hydrogen, $C_1-C_6$ aliphatic or cycloaliphatic monovalent organic radicals, or $C_6-C_{12}$ aromatic monovalent organic radicals.

15. The method of claim 14 wherein said tricarboxylic acid is trimellitic anhydride.

16. The method of claim 1 wherein (iii) is (b).

17. The method of claim 16 wherein said high molecular weight polyoxyalkylene diimide diacid is represented by the formula

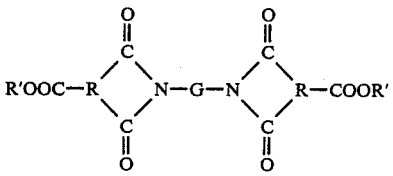

wherein
G is the radical remaining after the removal of the amino groups of a long chain poly(oxy alkylene) diamine having an average molecular weight of from about 600 to about 12,000,
R is independently selected from $C_2-C_{20}$ aliphatic or cycloaliphatic organic radicals or $C_6-C_{20}$ trivalen aromatic trivalent organic radicals, and
R' is independently selected from hydrogen, $C_1-C_6$ aliphatic or cycloaliphatic monovalent organic radicals, or $C_6-C_{12}$ monovalent aromatic organic radicals.

18. The method of claim 1 wherein R is a $C_6$ trivalent organic aromatic hydrocarbon radical.

19. The method of claim 18 wherein R' is hydrogen.

20. The method of claim 18 wherein G is the residue remianing after the removal of the amino groups of a long chain poly(oxy alkylene)diamine having an average molecular weight of from about 900 to about 4,000.

21. The method of claim 1 wherein (B) is carried out under vacuum.

22. The method of claim 1 wherein (B) is carried out under an inert atmosphere.

23. The method of claim 22 wherein said inert atmosphere is nitrogen.

24. The method of claim 22 wherein a stream of nitrogen gas is directed into the reaction vessel in which the oligomer is being heated.

25. The method of claim 24 wherein said oligomer is heated to a temperature from about 100° C. to about 250° C.

* * * * *